United States Patent [19]

Renault et al.

[11] 3,962,410

[45] *June 8, 1976

[54] PROCESS FOR PURIFYING INDUSTRIAL GASES CONTAINING HYDROGEN SULFIDE WITH SULFUR PRODUCTION

[75] Inventors: Philippe Renault, Noisy-Le-Roi; André Deschamps, Chatou; Claude Dezael, Maisons-Laffitte, all of France

[73] Assignee: Institut Francais du Petrole, des Carburants et Lubrifiants, Rueil-Malmaison, France

[ * ] Notice: The portion of the term of this patent subsequent to Nov. 5, 1991, has been disclaimed.

[22] Filed: Nov. 19, 1973

[21] Appl. No.: 416,868

[30] Foreign Application Priority Data

Nov. 20, 1972 France .............................. 72.41219

[52] U.S. Cl. .............................. 423/574 R; 423/232; 423/423; 423/428; 423/563

[51] Int. Cl.[2] ........................ C01B 17/04; C01D 7/02

[58] Field of Search ........... 423/189, 232, 233, 234, 423/421, 422, 423, 428, 567, 569, 570, 571, 572, 573, 575, 209, 222, 574

[56] References Cited

UNITED STATES PATENTS

| | | | |
|---|---|---|---|
| 1,440,977 | 2/1971 | Espenhahn | 423/232 |
| 3,561,925 | 2/1971 | Deschamps et al. | 423/573 X |
| 3,598,529 | 8/1971 | Deschamps et al. | 423/575 |
| 3,796,796 | 3/1974 | Deschamps et al. | 423/575 |
| 3,846,539 | 11/1974 | Renault et al. | 423/574 |

FOREIGN PATENTS OR APPLICATIONS

| | | | |
|---|---|---|---|
| 765,673 | 1/1957 | United Kingdom | 423/232 |

*Primary Examiner*—Oscar R. Vertiz
*Assistant Examiner*—Gary P. Straub
*Attorney, Agent, or Firm*—Millen, Raptes & White

[57] ABSTRACT

Process for purifying industrial gases containing hydrogen sulfide and for simultaneously producing elemental sulfur, comprising contacting said gases with an aqueous solution of sodium hydroxide and/or sodium carbonate, thereby forming a sodium sulfide solution, contacting said solution with an aqueous solution of ammonium hydrogen carbonate or with a gaseous mixture of $CO_2$ and $NH_3$ so as to precipitate sodium hydrogen carbonate, decomposing the latter to $CO_2$ and neutral sodium carbonate which is recycled, heating the resulting liquid phase to produce $NH_3$ and $H_2S$ and producing sulfur by reacting the $H_2S$ with sulfurous anhydride.

6 Claims, 1 Drawing Figure

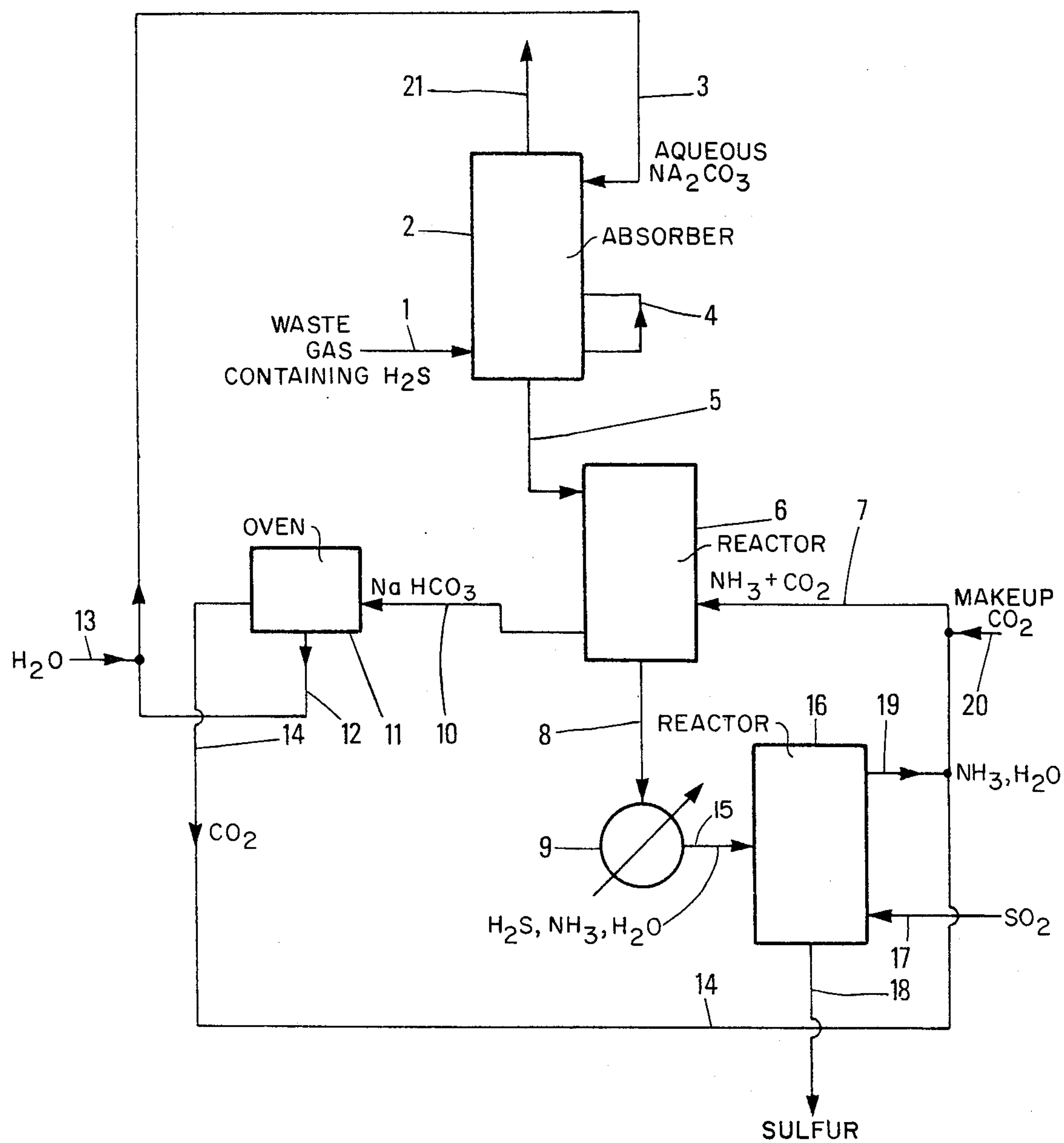
21
3
AQUEOUS
$NA_2CO_3$
2
ABSORBER
1
4
WASTE
GAS
CONTAINING $H_2S$
5
6
7
REACTOR
OVEN
Na $HCO_3$
$NH_3 + CO_2$
MAKEUP
$CO_2$
13
$H_2O$
20
14
12
11
10
8
REACTOR
16
19
$NH_3, H_2O$
$CO_2$
9
15
$H_2S, NH_3, H_2O$
$SO_2$
17
14
18
SULFUR

PROCESS FOR PURIFYING INDUSTRIAL GASES CONTAINING HYDROGEN SULFIDE WITH SULFUR PRODUCTION

CROSS-REFERENCE TO RELATED APPLICATION

This application is related to applicants' co-pending application Ser. No. 296,226, filed Oct. 10, 1972 and now Pat. No. 3,846,539, issued Nov. 5, 1974.

The regenerative process for purifying, under wet conditions, waste-gases containing hydrogen sulfide may comprise the use of ammonia solutions. Due to the moderate basicity and the high volatility of ammonia, it is not always possible to perform a very complete purification. On the contrary, by using sodium hydroxide or sodium carbonate, it is possible to achieve very high purification rates, but the resulting brines, containing sodium sulfides, are difficult to regenerate.

The present invention concerns the conversion of said sodium sulfides to sodium carbonate with production of sulfur, the produced sodium carbonate being reusable as agent for absorbing the hydrogen sulfide contained in the waste-gas.

According to the invention, the addition of ammonium bicarbonate (ammonium hydrogen carbonate, $NH_4HCO_3$) to sodium sulfide solutions results in the precipitation of sodium bicarbonate (sodium hydrogen carbonate, $NaHCO_3$) which is separated and converted, by heating, to sodium carbonate and carbon dioxide. The aqueous solution contains only ammonium sulfides which, by treatment with sulfurous anhydride, for example according to the process described in the French Pat. No. 1,568,748, are converted to sulfur and ammonia. An alternative embodiment consists of thermally decomposing said ammonium salts and reacting the resulting $H_2S$ with sulfurous anhydride in the presence of a liquid phase. The ammonia and the carbon dioxide recovered during the conversion are used in the precipitation step.

A first step of the process consists of absorbing the hydrogen sulfide contained in an industrial gas by means of a solution of sodium carbonate preferably containing sodium hydroxide, at a sodium concentration of, for example, from 0.1 to 4 moles per liter and preferably about 2 moles per liter. The temperature is advantageously from 50° to 80°C under atmospheric pressure and, in most cases, is close to the dew point of the gas. This operation results in the recovery of brines containing sodium sulfides.

In a second step, the brine produced in the first step is contacted, in a reactor, at a relatively low temperature, preferably from 0° to 50°C and generally at about 40°C, with ammonium hydrogen carbonate: the residual aqueous solution will then contain ammonium salts. This precipitation may also be obtained by bubbling $CO_2$ and $NH_3$, in the gaseous state, through the brine of ammonium salts. Sodium hydrogen carbonate is formed which, under the operating conditions, is precipitated for the most part. It is separated by filtration or centrifugation for example.

The pressure in the second step reactor may be, for example, close to the atmospheric pressure when the precipitation agent is ammonium hydrogen carbonate but, in the case of a gas comprising $CO_2$ and $NH_3$, it will be greater than the atmospheric pressure. It may reach for example, 20 atmospheres, but will be preferably close to 1 to 2 atmospheres.

The third step of the process consists of treating by $SO_2$ the solution which contains ammonium sulfides obtained in the second step so as to produce elemental sulfur which is removed and to recover free ammonia. The temperature during said step is, for example, from 90° to 170°C and we proceed advantageously in the presence of a liquid which may be, for example, a glycol. Instead of a glycol, there can be used, for example, a glycol ether or ester, a polyalkylene glycol, a polyalkylene glycol ether or ester, a heavy alcohol, a phosphoric ester, N-methylpyrrolidone or molten sulfur. Optionally catalysts of the reaction of $SO_2$ with $H_2S$ may be used. The $SO_2$ used may result, for example, from the combustion of sulfur or of sulfur containing products.

Instead of treating the ammonium sulfides we may advantageously carry out the third step with the products of their thermal decomposition, i.e. with a mixture of $H_2S$ with ammonia.

Separately, the sodium hydrogen carbonate produced in the second step is heated in an oven to a temperature of, for example, from 120° to 200°C and preferably close to 150° for being decomposed to neutral sodium carbonate and carbon dioxide. The carbonate may be reused for absorbing the $H_2S$ contained in industrial fumes. The carbon dioxide of the second step may be reacted with ammonia and steam produced in the third step, for regenerating the ammonium/hydrogen carbonate used in the second step.

It is generally necessary to provide for a $CO_2$ make up for carrying out the conversion in order to comply with the stoichiometry of the reaction. This make up consists of $CO_2$ produced during the first step or of purified waste-gas. As above-mentioned, it is not necessary to recombine $CO_2$ and $NH_3$ and their mixture may be merely recycled to the second step.

The reactions occuring during the above-mentioned steps are the following:

$$Na_2S + 2\ NH_4HCO_3 \rightarrow 2\ NaHCO_3 + (NH_4)_2S$$

$$NaHS + NH_4HCO_3 \rightarrow Na\ HCO_3 + NH_4HS$$

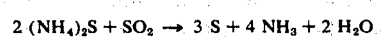

$$2\ (NH_4)_2S + SO_2 \rightarrow 3\ S + 4\ NH_3 + 2\ H_2O$$

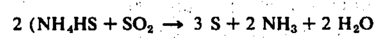

$$2\ (NH_4HS + SO_2 \rightarrow 3\ S + 2\ NH_3 + 2\ H_2O$$

The invention will be further illustrated by the accompanying drawing, given by way of example.

A waste-gas, containing for example 0.2 % of $H_2S$, is introduced from pipe 1 into the absorption zone 2. The absorbing aqueous solution of sodium carbonate, introduced through line 3, is recirculated through the absorption zone through line 4. The temperature is about 60°C. The sodium sulfide containing solution is discharged through pipe 5 and enters the reactor 6. A mixture of ammonia and carbon dioxide introduced through pipe 7 is bubbled through the reactor.

The temperature reaches for example 35°C and the pressure is for example 2 atmospheres. The sodium hydrogen carbonate precipitates; through pipe 8 a filtrate is recovered which is vaporized in 9. The sodium hydrogen carbonate is conveyed through line 10 to the oven 11 where it is dried and roasted. The sodium carbonate resulting from said operation is recovered in 12 and joins after solubilization thereof by means of a water make up in 13, the absorption zone, through line 3. The $CO_2$ escapes through line 14. The vapors produced by vaporization of the filtrate issued from the reactor 6 escape through pipe 15. They contain essentially $H_2S$, $NH_3$ and water. They are introduced into a reactor 16 containing, for example, polyethylene glycol having an average molecular weight of 400, having added thereto 1 % by weight of potassium benzoate and maintained at a temperature of, for example, 160°C, in which they are contacted with $SO_2$ coming from line 17. The produced sulfur is removed through line 18 and the ammonia and the steam escaping from line 19 join the $CO_2$ circulating in line 14. Thus the mixture of $CO_2$ and $NH_3$ may be reconstituted in line 7, feeding the reactor 6. A $CO_2$ make up is provided through line 20. The treated gas escape from the absorption zone through the stack 21.

The following non limitative example illustrates the invention:

EXAMPLE

A brine obtaned by absorption of the $H_2S$ contained in an industrial gas, by means of an aqueous solution of $Na_2CO_3$, and containing 1 mole/liter of NaHS and 1.3 mole/liter of $NaHCO_3$, is introduced into a reactor. The latter is maintained at the atmospheric pressure and at a temperature of 35°C. We also introduce thereinto a mixture of $CO_2$, $NH_3$ and $H_2O$.

There is formed a precipitate of $NaHCO_3$ which is separated and sent to a oven where it is roasted. The $Na_2CO_3$ as formed is separated and the $CO_2$ which evolves is fed back to the reactor. The liquid effluent issuing from the reactor is introduced into a vaporizer maintained at a temperature of 110°C. We obtain, on the one hand, water and $Na_2CO_3$ which is recovered and, on the other hand, a gas stream containing, per hour:

$H_2S$ — 1 mole
$NH_3$ — 1 mole
$H_2O$ — 15 moles
$CO_2$ — 0.65 mole

This gas stream is then treated at 130°C in the presence of polyethylene glycol, by means of a gas stream resulting from the combustion of sulfur and which contains $SO_2$ and nitrogen. The formed sulfur is recovered.

The resulting vapor passes into a condenser so as to remove nitrogen contained therein. The molar composition of the condensate is as follows:

$NH_3$ — 5.4 %
$H_2O$ — 91.1 %
$CO_2$ — 3.5 %

It is fed back to the reactor of $NaHCO_3$ precipitation.

What we claim is:

1. A process for purifying a hydrogen sulfide containing gas by means of an aqueous solution of sodium hydroxide or sodium carbonate, comprising the steps of:

a. contacting said gas with an aqueous solution of sodium hydroxide or sodium carbonate, so as to obtain a sodium sulfide solution, b. contacting the sodium sulfide solution with an aqueous solution of ammonium hydrogen carbonate or with an equivalent gaseous mixture of carbon dioxide and ammonia, to precipitate sodium hydrogen carbonate and form a remaining liquid phase.

c. separating resultant precipitated sodium hydrogen carbonate from the remaining liquid phase, and d. heating the remaining liquid phase from step c), to produce a gas containing ammonia, hydrogen sulfide and carbon dioxide.

2. A process according to claim 1 wherein step (a) is conducted at 50°–80°C with a sodium concentration of 0.1–4 mols per liter; and step (b) is conducted at 0°–50°C.

3. A process according to claim 1 wherein said separated sodium hydrogen carbonate is converted to carbon dioxide and sodium cabonate, the carbon dioxide is separated from the sodium carbonate, the separated carbon dioxide is recycled to step b), and the separated sodium carbonate is recycled to step a).

4. A process according to claim 3 wherein the conversion of sodium hydrogen carbonate dioxide and sodium carbonate is conducted at 120°–200°C.

5. A process according to claim 1 wherein said gas produced in step (d) containing ammonia, hydrogen sulfide and carbon dioxide is reacted with sulfur dioxide to produce sulfur, the sulfur is separated from the remaining gas containing ammonia and carbon dioxide, and said remaining gas is recycled to step (b).

6. A process according to claim 5 wherein said reacting with sulfur dioxide is conducted at 90°–170°C.

* * * * *